US012801522B2

(12) United States Patent
Williams et al.

(10) Patent No.: US 12,801,522 B2
(45) Date of Patent: Nov. 17, 2026

(54) DATA SET STREAMING AND PROCESSING IN COMPUTATIONAL STORAGE DEVICES

(71) Applicant: SK Hynix NAND Product Solutions Corp., Rancho Cordova, CA (US)

(72) Inventors: Steven Williams, Longmont, CO (US); Jason Molgaard, Windsor, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/987,864

(22) Filed: Dec. 19, 2024

(65) Prior Publication Data

US 2026/0178477 A1 Jun. 25, 2026

(51) Int. Cl.
*G06F 12/02* (2006.01)

(52) U.S. Cl.
CPC .. *G06F 12/0246* (2013.01); *G06F 2212/7201* (2013.01); *G06F 2212/7202* (2013.01); *G06F 2212/7203* (2013.01)

(58) Field of Classification Search
None
See application file for complete search history.

(56) References Cited

U.S. PATENT DOCUMENTS

| | | | | |
|---|---|---|---|---|
| 8,219,776 | B2 | 7/2012 | Forhan et al. | |
| 10,990,289 | B2 * | 4/2021 | Barrell | G06F 12/0862 |
| 2008/0183931 | A1 * | 7/2008 | Verm | G06F 12/10 710/260 |
| 2012/0239871 | A1 | 9/2012 | Badam et al. | |
| 2012/0324176 | A1 * | 12/2012 | Bohling | G06F 3/0671 711/E12.001 |
| 2015/0302903 | A1 * | 10/2015 | Chaurasia | G06F 12/0842 711/105 |
| 2015/0378933 | A1 | 12/2015 | Ooba et al. | |
| 2019/0130947 | A1 * | 5/2019 | Yoon | G11C 11/005 |
| 2019/0235789 | A1 * | 8/2019 | Yan | G06F 3/0656 |
| 2019/0236009 | A1 * | 8/2019 | Burger | G06F 9/30036 |
| 2020/0065240 | A1 * | 2/2020 | Choi | G06F 3/0604 |
| 2020/0158882 | A1 * | 5/2020 | Anderson | G06F 3/0673 |

(Continued)

OTHER PUBLICATIONS

SK Hynix NAND Product Solutions Corp. (dba Solidigm), PCT/US2025/060461, International Search Report and Written Opinion, Apr. 29, 2026, 9 pgs.

*Primary Examiner* — Jared I Rutz
*Assistant Examiner* — Alexander J Yoon
(74) *Attorney, Agent, or Firm* — Morgan, Lewis & Bockius LLP

(57) ABSTRACT

This application is directed to data buffering in a computational storage device (e.g., a memory device having data processing capability). A memory device includes one or more processors, a volatile memory, and a non-volatile memory storing a data set. A portion of the volatile memory is allocated to facilitating data processing, and further includes a buffer having a buffer size smaller than a data size of the data set. The memory device loads a subset of the data set from the non-volatile memory to the buffer, and identifies a first data portion having a predefined portion size. In accordance with a determination that the first data portion has been processed, the memory device loads a next data portion of the data set from the non-volatile memory to the buffer in place of a subset of the first data portion (e.g., less than all or all of the first data portion).

20 Claims, 12 Drawing Sheets

(56) References Cited

U.S. PATENT DOCUMENTS

| | | | | |
|---|---|---|---|---|
| 2022/0083256 | A1* | 3/2022 | Muthiah | G06F 3/0604 |
| 2023/0072613 | A1 | 3/2023 | Ji et al. | |
| 2024/0289287 | A1 | 8/2024 | Dreier et al. | |

* cited by examiner

DATA SET STREAMING AND PROCESSING IN COMPUTATIONAL STORAGE DEVICES

TECHNICAL FIELD

This application relates generally to volatile memory management in a storage device including, but not limited to, methods, systems, and non-transitory computer-readable media for buffering data to facilitate further data processing in a computational storage device (e.g., a memory device having data processing capabilities).

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). The secondary memory relies on a storage controller to manage its memory space and process read, write, and read-modify-write requests from a host device efficiently with low latency. The secondary memory have been developed to integrate local in-memory data processing capabilities; however, these capabilities are often limited by the constrained processing and buffering resources available on the second memory, as well as the prioritization of memory management operations. The overall effectiveness of data processing may be significantly impacted.

SUMMARY

Various embodiments of this application are directed to methods, systems, devices, non-transitory computer-readable media for buffering data to facilitate further data processing in a computational storage device (e.g., a memory device having data processing capabilities). A buffer is reserved in a volatile memory (e.g., dynamic random-access memory (DRAM), static random-access memory (SRAM)) of the memory device. In some implementations, when the memory device is configured to operate as a computational storge device, it may load a set of data (e.g., a file) from a non-volatile storage media (e.g., NAND flash memory) into the buffer that is available for a computational function. A capacity of the non-volatile storage media is larger than a buffer size of the buffer, allowing the data set to be entirely stored in the non-volatile storage media, while the data set has a data size greater than the buffer size of the buffer. The data set is loaded into the buffer reserved in the volatile memory in a plurality of subsets or data portions. The memory device may load a next data portion of the data set into the buffer and process another data portion previously loaded in the buffer alternatingly or concurrently. By these means, the buffer is utilized efficiently to facilitate in-memory data processing of a data set, causing little or no impact on memory management operations of the memory device.

In one aspect, a method is implemented at a memory device having one or more processors, a volatile memory, and a non-volatile memory storing a data set (e.g., a file). The method includes allocating a portion of the volatile memory to data processing. The portion of the volatile memory includes a buffer having a buffer size, and the data set has a data size greater than the buffer size. The method further includes loading a subset of the data set from the non-volatile memory to the buffer and identifying a first data portion having a predefined portion size. The method further includes, in accordance with a determination that the first data portion has been processed, loading a next data portion of the data set from the non-volatile memory to the buffer in place of a subset of the first data portion.

In some embodiments, the subset of the data set corresponds to an ordered sequence of successive virtual memory addresses, and the first data portion has a set of first virtual memory addresses lower than a remainder of the ordered sequence of successive virtual memory addresses. The next data portion has a set of successive virtual memory addresses immediately following the set of first virtual memory addresses.

In some embodiments, after the buffer is initially filled, a plurality of data portions having a fixed size of the next data portion are successively loaded into the buffer, and each of the plurality of data portions replaces a respective portion of a corresponding subset of the data set that is already stored in the buffer.

In another aspect, some implementations include a memory device having one or more processors, a volatile memory, and a non-volatile memory storing a data set. The non-volatile memory has instructions stored thereon for performing any of the above methods to buffer and process data in the memory device.

In yet another aspect, some implementations include a non-transitory computer readable storage medium storing one or more programs, which when executed by a memory device cause the memory device to implement any of the above methods to buffer and process data in the memory device.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with storage capabilities.

Figure 1:
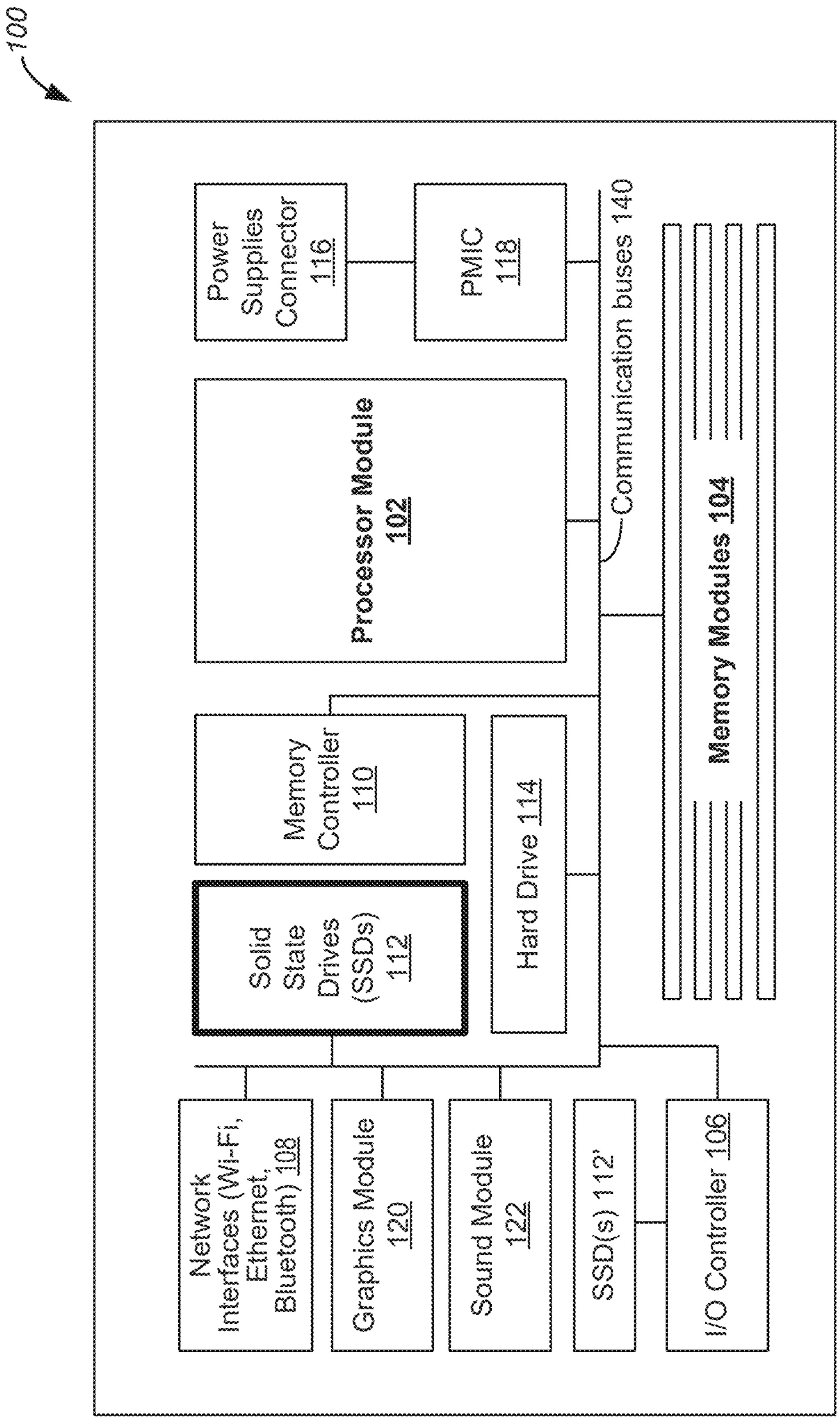
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash storage devices, or other non-volatile solid state storage devices. In some embodiments, the memory modules 104, or alternatively the non-volatile storage device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a storage controller 110, SSD(s) 112, an HDD 114, power management integrated circuit (PMIC) 118, a graphics module 120, and a sound module 122. The storage controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
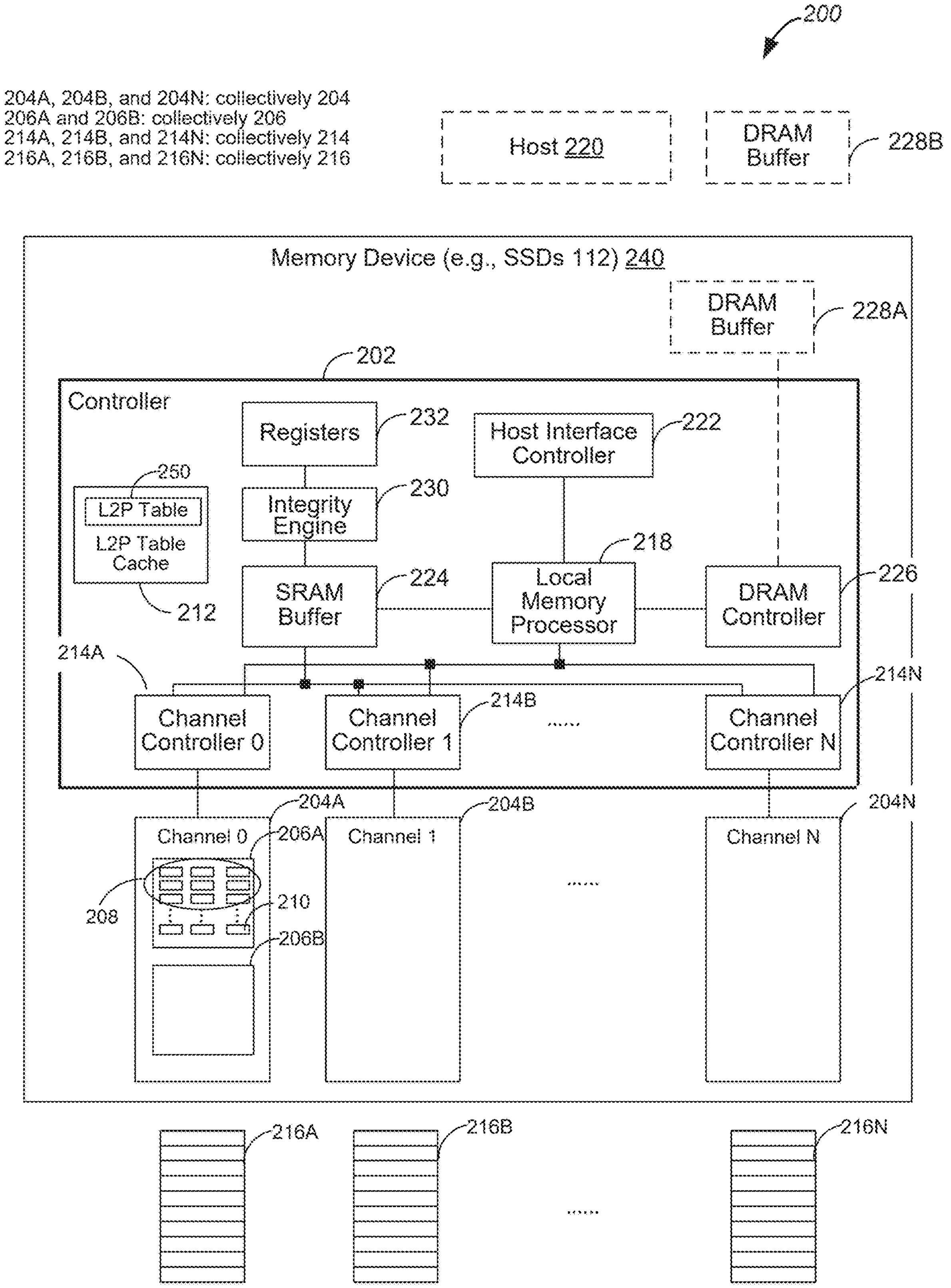
FIG. 2 is a block diagram of a storage system of an example electronic device having one or more memory access queues, in accordance with some embodiments.

FIG. 2 is a block diagram of a storage system 200 of an example electronic device having one or more memory access queues, in accordance with some embodiments. The storage system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the storage system 200 and process the instructions and data to run an operating system (OS) and execute user applications. The storage system 200 includes one or more storage devices 240 (e.g., SSD(s)). Each storage device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each storage device 240 is formed on a printed circuit board (PCB).

Each memory channel 204 includes one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the storage device 240 includes a plurality of superblocks. Each superblock includes a plurality of memory blocks each of which further includes a plurality of memory pages 210. For each superblock, the plurality of memory blocks are configured to be written into and read from the storage system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The storage device 240 stores information of an ordered list of superblocks in a cache of the storage device 240. In some embodiments, the cache is managed by a host driver of the host device 220, and called a host managed cache (HMC).

In some embodiments, the storage device 240 includes a single-level cell (SLC) NAND flash memory chip, and each memory cell stores a single data bit. In some embodiments, the storage device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits (e.g., X data bits, where X is greater than 5). Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the storage device 240 corresponds to a single queue 216 of memory access requests. Each memory access request is optionally received internally from the storage device 240 to manage the respective memory channel 204 or externally from the host device 220 to write or read data stored in the respective channel 204. Specifically, each memory access request includes one of: a system write request that is received from the storage device 240 to write to the respective memory channel 204, a system read request that is received from the storage device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a storage controller 202 to implement internal memory management functions including, but are not limited to, garbage collection, wear levelling, read disturb mitigation, memory snapshot capturing, memory mirroring, caching, and memory sparing. In some embodiments, each of a host write request and a host read request corresponds to a respective input/output (I/O) access operation. Alternatively, in some embodiments, each of a system read request, a system write request, a host write request, and a host read request corresponds to a respective input/output (I/O) access operation In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. In some embodiments, each page has user data of a data size that is distinct from 4 KB and 16 KB, and metadata having a data size that is distinct from 2 KB. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in storage device 240, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the storage device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

In some embodiments, the storage system 200 includes an SSD having an L2P address indirection table 250 that stores physical addresses for a set of logical addresses, e.g., a logical block address (LBA). In some embodiments, the L2P address indirection table 250 is stored in an L2P table cache 212 included in the controller 202. Alternatively, in some embodiments, the storage system 200 includes a DRAM buffer 228A, and the L2P address indirection table 250 is stored in the DRAM buffer 228A. The local memory processor 218 of the controller 202 accesses the DRAM buffer 228A via a DRAM controller 226.

In some embodiments, a memory device 240 (also called a storage device) includes a plurality of processing cores, and is transformed to a computational storage device (CSD) by configuring two separate subsets of processing cores to a memory controller 202 and a data processor (e.g., data processor 312 in FIG. 3), respectively. The data processor is configured to process internal computational storage operations (e.g., data processing operations) locally on the memory device 240, while the memory controller 202 of the memory device 240 specializes in performing generic storage functions including memory access functions (e.g., input/output (I/O) access operations) and internal memory management functions. In some embodiments, the memory controller 202 and the data processor of the memory device 240 at least partially share certain hardware resources in a time-multiplexed manner. The memory device 240 may operate in a computational storage elevation (CSE) mode, when the hardware resources (e.g., processing cores) are allocated to the computational storage functions or adjusted between the memory access functions and the computational storage functions.

Figure 3:
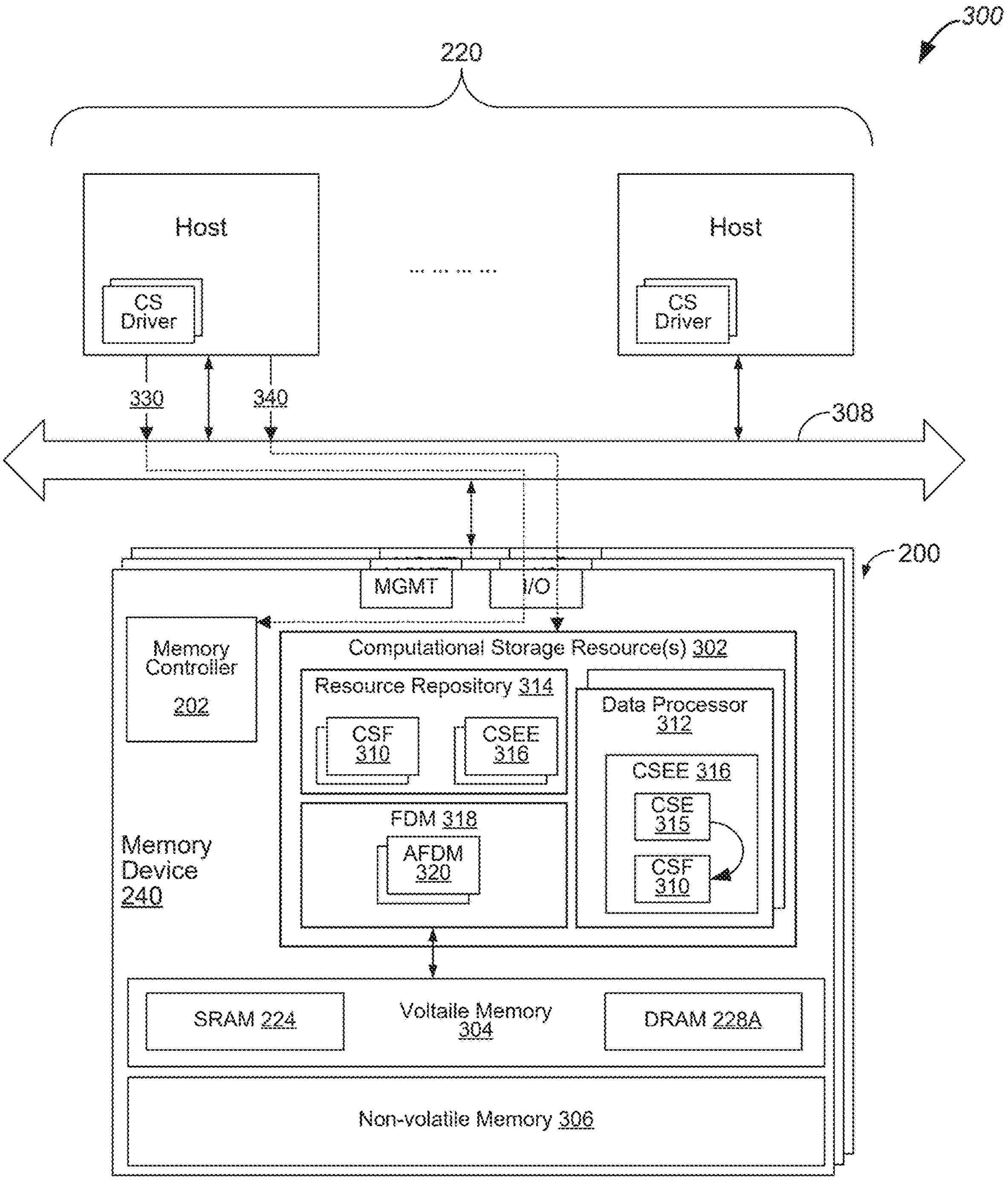
FIG. 3 is a block diagram of an example computer system that includes a storage system having an internal processing capability, in accordance with some embodiments.

FIG. 3 is a block diagram of an example computer system 300 that includes a storage system 200 having an internal processing capability, in accordance with some embodiments. The storage system 200 is also called a computational storage device (CSD), and includes one or more storage devices 240 (e.g., SSDs). Each storage device 240 further includes a storage controller 202, a volatile memory 304, and a non-volatile memory 306 (e.g., memory channels 204). The host device(s) 220 and the one or more storage devices 240 of the storage system 200 are coupled to each other via a communication fabric 308. The communication fabric 308 includes a communication bus 140 (FIG. 1) that operates in compliance with a data bus standard, e.g., Peripheral Component Interconnect Express (PCIe), Ethernet standards. The host device(s) 220 are configured to issue memory access requests to write data into, and read data from, the non-volatile memory 306. The storage controller 202 accesses the non-volatile memory 306 in response to the memory access operations. Additionally, in some embodiments, the storage controller 202 dispatch system read requests (also called background read requests or non-host read requests) and system write requests to implement internal memory management functions including, but are not limited to, garbage collection, wear levelling, read disturb mitigation, memory snapshot capturing, memory mirroring, caching, and memory sparing. The volatile memory 304 of each storage device 240 further includes one or more of a L2P table cache 212, an SRAM buffer 224, and a DRAM buffer 228A, and is configured to store data temporarily while the storage controller 202 accesses the non-volatile memory 306 for memory accesses or internal memory management.

In some embodiments, the storage controller 202 is dedicated to processing the memory access requests and internal memory management functions. A storage device 240 further includes one or more computational storage resources (CSRs) 302 configured to implement data processing operations locally on the storage device 240. A set of predefined data processing operations are implemented to perform a computational storage function (CSF) 310, which is distinct from the memory access and internal memory management functions performed by the storage controller 202. In some embodiments, a computational storage resource 302 processes user data that are received from the host device(s) 220 or extracted from the non-volatile memory 306 during the data processing operations. In some embodiments, the processed data are stored into the non-volatile memory 306 or sent to the host device(s) 220 via the fabric 308. Further, in some embodiments, a subset of the user data, the process data, and intermediate data generated during the data processing operations is temporarily stored in the volatile memory 304 (e.g., SRAM buffer 224, DRAM buffer 228A).

In some embodiments, the computational storage resource 302 includes one or more data processors 312 and a resource repository 314. The one or more data processors 312 provide a computational storage engine configured to perform one or more predefined data processing operations, e.g., associated with a computational storage function 310 of the computational storage resource 302. In some embodiments, the computational storage function 310 corresponds to an in-memory application associated with the computational storage engine, and is implemented via the computational storage engine in the storage device 240. The resource repository 314 is a centralized location (e.g., memory space) storing various types of data and resources, such as software libraries, configuration files, media files, or any other type of data needed for a plurality of computational storage functions 310 performed by the computational storage resource 302. For example, the resource repository 314 stores instructions for creating a computational storage engine environment (CSEE) 316 and instructions for implementing a set of data processing operations associated with a computational storage function 310 in the CSEE 316. Instructions are loaded from the resource repository 314 and executed by the data processor 312, thereby creating the CSEE 316 where the computational storage engine 315 is executed to implement data processing operations associated with the computational storage function 310.

In some embodiments, the computational storage resource 302 further includes a function data memory (FDM) 318 for storing data that are used or generated by the computational storage engine 315 for performing a computational storage function 310. In some embodiments, the function data memory 318 is included in the volatile memory 304. For example, the function data memory 318 corresponds to a portion of the DRAM buffer 228A (FIG. 2). In another example, the function data memory 318 corresponds to a portion of the SRAM buffer 224 (FIG. 2). Further, in some embodiments, a portion of the function data memory 318

(also called an allocated FDM (AFDM) 320) is allocated for one or more instances of a computational storage function 310.

In some embodiments, a host device 22 issues a memory read or write request 330 to a storage device 240 of the storage system 200, and the storage controller 202 of the storage device 240 receives the memory read or write request 330 and accesses the non-volatile memory 306 accordingly. Alternatively, in some embodiments, a host device 22 issues a data processing request 340 to the storage device 240, and a data processor 312 of the computational storage resource 302 (e.g., the computational storage engine 315) receives the data processing request 340 and processes user data extracted from the data processing request or the non-volatile memory 306.

Figure 4:
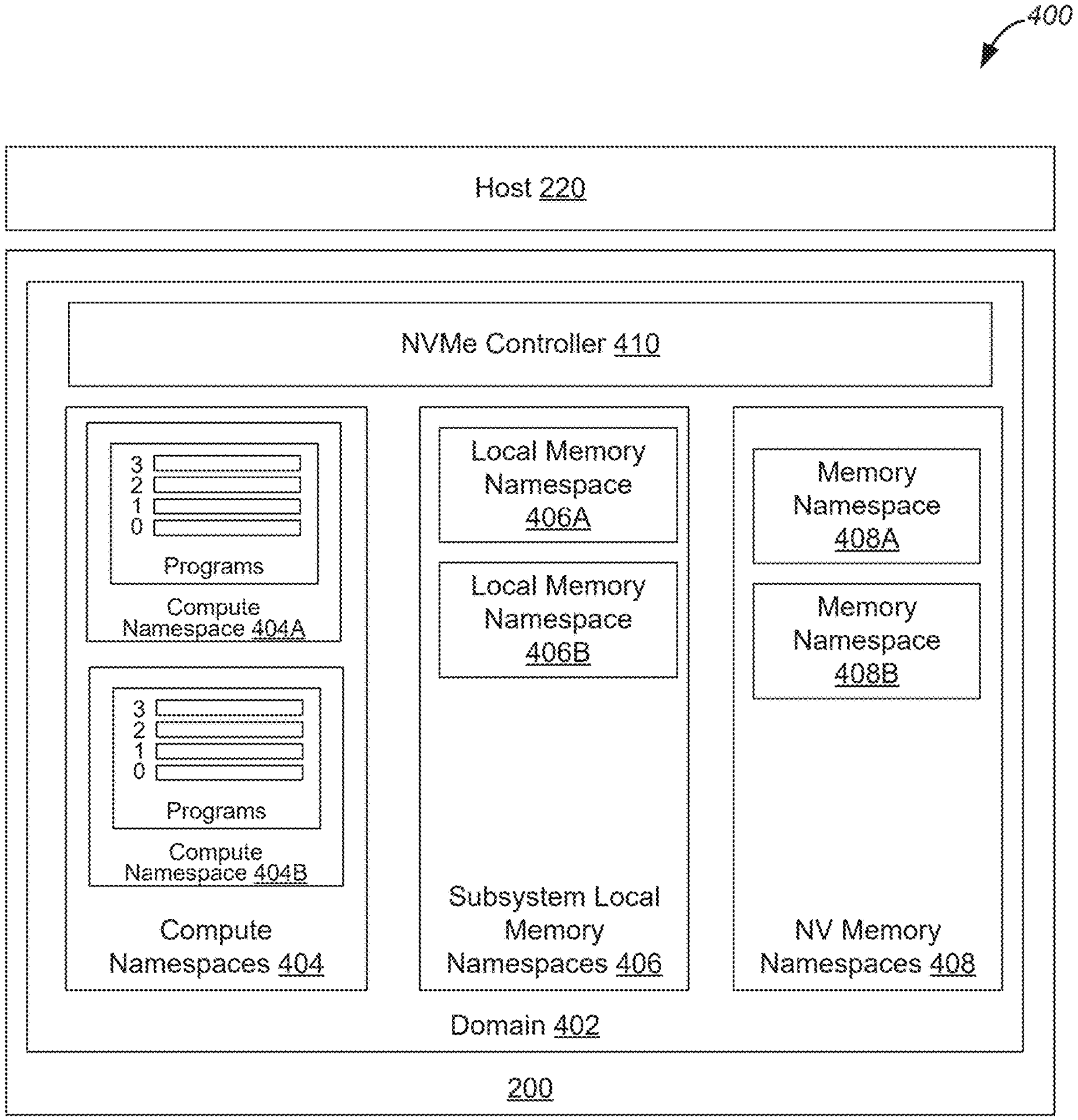
FIG. 4 is a block diagram of an example computer system including a storage system that operates in compliance with a storage access and transport protocol, in accordance with some embodiments.

FIG. 4 is a block diagram of an example computer system 400 including a storage system 200 that operates in compliance with a storage access and transport protocol (e.g., nonvolatile memory express (NVMe)), in accordance with some embodiments. The storage system 200 includes one or more storage devices 240 each of which corresponds to a domain 402 according to the storage access and transport protocol. Each domain 402 corresponding to a respective storage device 240 includes a one or more compute namespace 404, local memory namespaces 406, memory namespaces 408, and a domain controller 410. Each namespace is a collection of LBAs accessible to, or associated with, a respective one of the plurality of programs.

A storage device 240 includes one or more processors having a computation capability (e.g., a storage controller 202, a data processor 312), a volatile memory 304 (e.g., a cache 212, an SRAM buffer 224, a DRAM buffer 228A), and a non-volatile memory 306. When the storage device 240 executes a plurality of programs, resources of the storage controller 202, the volatile memory 304, and the non-volatile memory 306 are allocated to implement the plurality of programs based on the storage access and transport protocol (e.g., NVMe). A plurality of compute namespaces 404 (e.g., 404A and 404B) correspond to, are configured to provide, instructions of the plurality of programs executed by the one or more programs of the storage device 240. Resources of the volatile memory 304 are allocated based on a plurality of local memory namespaces 406 (e.g., 406A and 406B) to facilitate execution of the plurality of programs by the storage device 240, so are resources of the non-volatile memory 306 allocated based on a plurality of memory namespaces 408 (e.g., 408A and 408B). It is noted that, in some embodiments, a number of programs is not limited to 2 and may be greater than 2, thereby creating more than two namespaces in each type of namespaces 404, 406, or 408.

In an example, a compute namespace 404A corresponds to a respective local memory namespace 406A and a respective non-volatile memory namespace 408A. The compute namespace 404A provides instructions of a corresponding program for execution by the one or more processors of the storage device 240. In some situations, input data that are processed, and output data that are generated, by these instructions are temporarily stored based on the local memory namespace 406A. In some situations, the input data are extracted based on the non-volatile memory namespace 408A, and the output data are stored based on the non-volatile memory namespace 408A. By these means, namespace allocation and utilization in the domain 402 corresponding to the storage device 240 are managed according to the storage access and transport protocol.

In some embodiments, the storage access and transport protocol includes a NVMe protocol for accessing flash storage (e.g., SSDs) via a PCI Express (PCIe) bus. The PCIe bus is configured to support a plurality of parallel command queues (e.g., on an order of 104 queues), thereby operating with a substantially high throughput and a substantially fast response time. In some embodiments, the host device 220 is configured to communicate and interact with each storage device 240 (e.g., SSD) as a standard NVMe storage device using the NVMe protocol. The host device 220 is configured to read and write data and implement data processing operations on the storage device 240 using NVMe commands.

In some embodiments, the host device 220 uses an operating system (e.g., a Linux operating system), and the CSRs 302 (FIG. 3) of the storage device 240 uses an embedded operating system (e.g., an embedded Linux operating system) that matches the operating system of the host device 220. In some embodiments, the host device 220 uses extended vendor unique commands to control and interact with the embedded operating system of the CSRs 302 of the storage device 240.

Figure 5A:
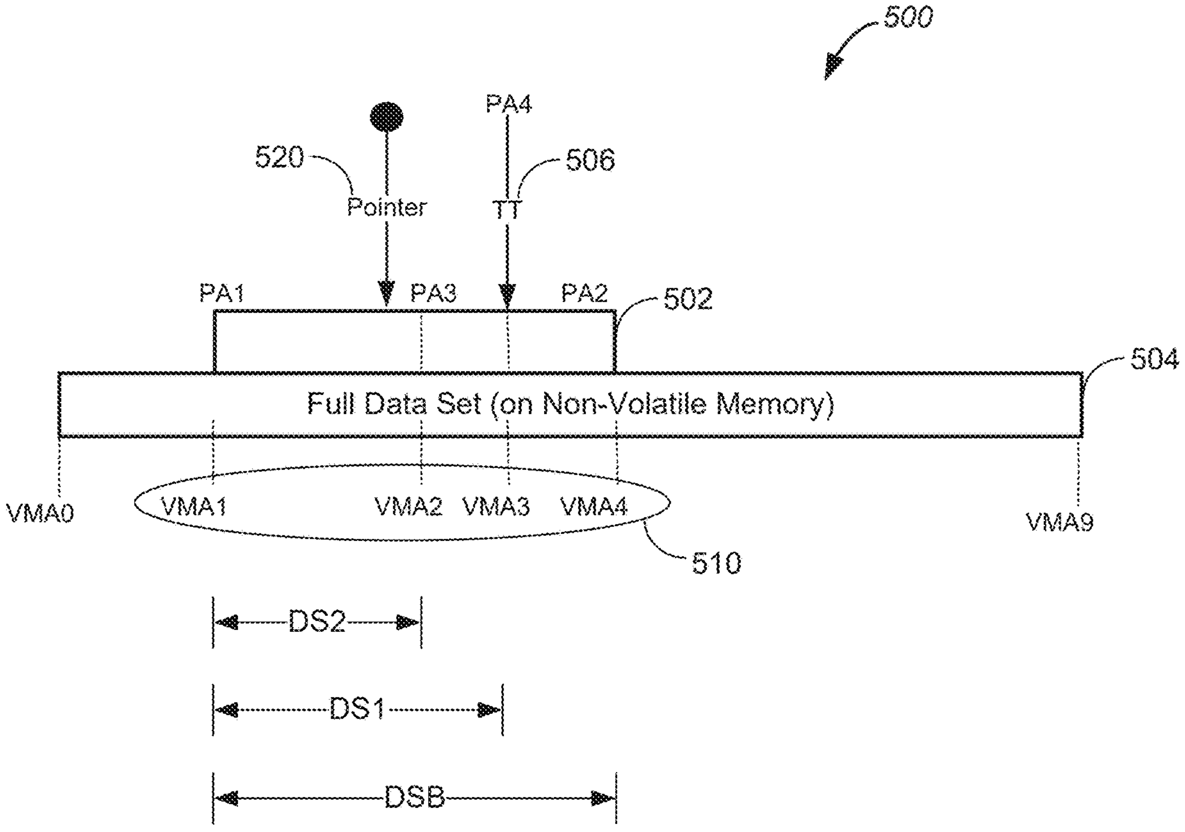
FIGS. 5A-5C illustrate an example process of applying a buffer to facilitate processing of a data set by a memory device, in accordance with some embodiments.
Figure 5B:
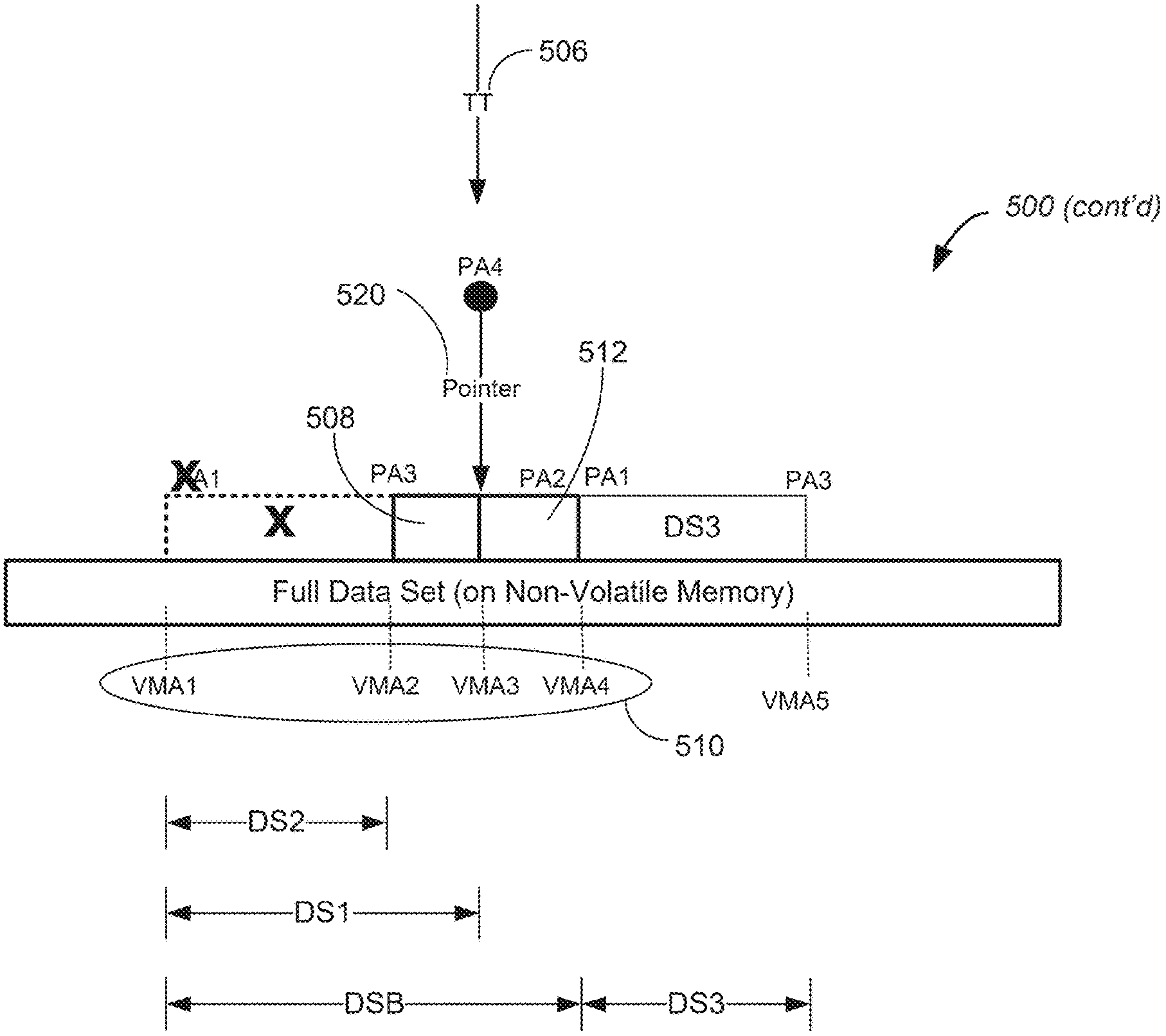
Figure 5C:
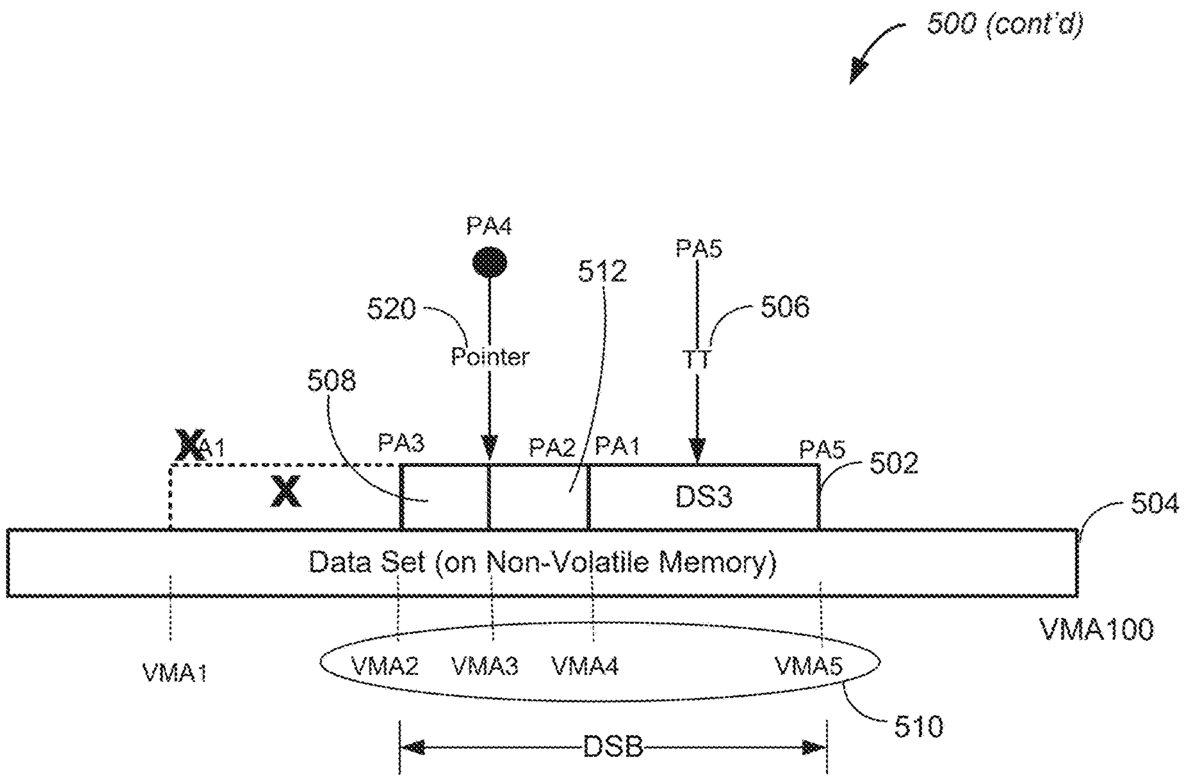

FIGS. 5A-5C illustrate an example process 500 of applying a buffer 502 to facilitate processing of a data set 504 by a memory device 240, in accordance with some embodiments. The example process 500 is implemented by a memory device 240 (FIG. 2) having one or more processors (e.g., processors 802 in FIG. 8), a volatile memory 304, and a non-volatile memory 306. Examples of the volatile memory 304 include the SRAM 224 and the DRAM 228A in FIG. 2. Examples of the non-volatile memory 306 include memory channels 204A-204N in FIG. 2. A data set 504 (e.g., a file) is stored in the non-volatile memory 306. In some embodiments, one or more processors are configured to provide a memory controller 202 and a data processor 312. The data processor 312 processes the data set 504 stored in the non-volatile memory 306 using the buffer 502. In some embodiments, the memory controller 202 and the data processor 312 physically correspond to different portions of the one or more processors. For example, the memory controller 202 includes a first set of processing cores, and the data processor 312 includes a second set of processing cores each of which is distinct form the first set of processing cores. Alternatively, in some embodiments, the memory controller 202 and the data processor 312 share at least a subset of the one or more processors (e.g., a common processing core), and the subset of the one or more processors are temporally assigned to function as the memory controller 202 and the data processor 312 during distinct temporal slots.

The memory device 240 allocates a portion of the volatile memory 304 to facilitate data processing implemented by the data processor 312, and the portion of the volatile memory 304 includes a buffer 502 having a buffer size. The data set 504 has a data size $S_D$ greater than the buffer size $S_B$. Given the data size $S_D$ greater than the buffer size $S_B$, the memory device 240 segments the data set 504 into a plurality of data portions, and the data portions are successively loaded into the buffer 502 from which the data processor 312 obtains and processes the data set 504.

Referring to FIG. 5A, in some embodiments, the memory device 240 loads a subset of the data set 504 (e.g., DSB) from the non-volatile memory 306 to the buffer 502, and identifies a first data portion DS1 having a predefined portion size. Further, in some embodiments, the subset DSB of the data set 504 fills the buffer 502, which is allocated to the data processor 312 for executing an application (e.g., a computation application 806 in FIG. 8). The subset DSB of the data set 504 may be located at any position (e.g., at a start, in a middle, close to an end) of the data set 504. The first data portion DS1 corresponds to a trigger threshold 506 (TT) indicating that data processing consumes the first data portion DS1 of data stored in the buffer 502 and that a next data portion of the data set 504 needs to be loaded from the non-volatile memory 306. In some embodiments, the trigger threshold 506 (TT) and the first data portion DS1 correspond to a first portion size (e.g., 50 Megabytes (MB) or any other suitable sizes). Alternatively, in some embodiments, the trigger threshold 506 (TT) and the first data portion DS1 corresponds to a predefined percentage (e.g., 70%, 80%, or any other suitable percentages) of the buffer size $S_B$.

Referring to FIG. 5B, in some embodiments, in accordance with a determination that the first data portion DS1 has been processed, the memory device 240 loads the next data portion DS3 of the data set 504 from the non-volatile memory 306 to the buffer 502 in place of a subset (e.g., DS2) of the first data portion DS1. Further, in an example, the replaced subset DS2 of the first data portion DS1 is closer to the start of the data set 504 than a remainder subset 508 of the first data portion DS1. The next data portion DS3 or the replaced subset DS2 of the first data portion DS1 has a second portion size, which is equal to or smaller than the first portion size of the first data portion DS1. The second portion size may be measured with respect to the buffer size $S_B$ (e.g., as 50% of the buffer size $S_B$) or with a specific data size (e.g., 40 MB). In another example, the replaced subset DS2 of the first data portion DS1 is in the middle of the first data portion DS1. Alternatively, in some embodiments, the replaced subset DS2 of the first data portion DS1 includes a plurality of segments distributed in the first data portion DS1.

In some embodiments, the first data portion DS1 is complementary to a second data portion 512 in the subset DSB of the data set 504 loaded to the buffer 502. The second data portion 512 is processed, e.g., by the data processor 312 of the memory device 240, concurrently while the next data portion DS3 of the data set 504 is being loaded to the buffer 502 in place of the subset DS2 of the first data portion DS1.

In some embodiments, the data set 504 (DS1) corresponds to successive virtual memory addresses starting with an initial virtual memory address VMA0, and the subset of the data set 504 (DS1) corresponds to an ordered sequence of successive virtual memory addresses 510 (e.g., started with VMA1). The first data portion DS1 has a set of first virtual memory addresses VA1-VA3 lower than a remainder (e.g., VMA3-VMA4) of the ordered sequence of successive virtual memory addresses 510. The next data portion DS3 has a set of successive virtual memory addresses VMA4-VMA5 immediately following the ordered sequence of successive virtual memory addresses 510. In some embodiments, the replaced subset DS2 of the first data portion DS1 has virtual memory addresses closer to the initial virtual memory address VMA0 than the remainder subset 508 of the first data portion DS1. When a set of virtual memory addresses is represented as a first address to a second address (e.g., VMA1-VMA2), the set of virtual memory addresses includes the first address and does not include the second address if not otherwise explained. For example, VMA3 does not belong to virtual memory addresses VMA1-VMA3, and belongs to virtual memory addresses VMA3-VMA4.

Referring to FIG. 5C, in some embodiments, after the next data portion DS3 replaces the subset DS2 of the first data portion DS1, the subset DSB of the data set 504 is updated and includes the remainder subset 508 in the first data portion DS1, a second data portion 512 that has not been processed, and the next data portion DS3. The location of the trigger threshold 506 (TT) is modified based on the updated subset DSB of the data set 504. In an example, the location of the trigger threshold 506 (TT) corresponds to a virtual memory addressor of a data page of the next data portion DS3. Additionally, the ordered sequence of successive virtual memory addresses 510 (e.g., started with VMA1) is updated and corresponds to the virtual memory addresses VMA2-VMA5. The memory device 240 (specifically, the data processor 312) continues to process the subset DSB of the data set 504 loaded in the buffer 502 until hitting the trigger threshold 506 (TT) that has been updated.

In some embodiments, after or while the memory device 240 loads the subset DSB of the data set 504 into the buffer 502, the data processor 312 reads the subset DSB of the data set 504 from the buffer 502 and processes the subset DSB of the data set 504. A pointer 520 may be applied to track how much of the subset DSB of the data set 504 has been read and processed by the data processor 312 or which data page of the subset DSB of the data set 504 is being processed. For example, the pointer 520 points to the virtual memory address VMA1, a virtual memory address between addresses VMA1 and VMA2 (FIG. 5A), or the virtual memory address VMA3 associated with the trigger threshold 506 (TT) (FIG. 5B).

In some embodiments, the buffer 502 includes a plurality of physical addresses, e.g., PA1, PA2, PA3, and PA4. For example, referring to FIG. 5A, the physical addresses PA1, PA2, PA3, and PA4 of the buffer 502 are mapped to the virtual memory addresses VMA1, VMA4, VMA2, and VMA3 of the data set 504, respectively. After the next data portion DS3 replaces the subset DS2 of the first data portion DS1, the physical addresses PA2, PA3, and PA4 of the buffer 502 remain mapped to the virtual memory addresses VMA2 VMA3, and VMA4 of the data set 504, respectively. The physical addresses PA1 of the buffer 502 are mapped to a virtual memory address immediately following the address VMA4, and a physical address PA5 is mapped to the virtual memory address VMA5.

In some embodiments, a computational subsystem of the memory device 240 (e.g., corresponding to a data processor 302) detects a need to load additional data (e.g., next data portion DS3) based on an access pattern exhibited by an application or algorithm executed by the computational subsystem. In accordance with a determination that the additional data is needed, the additional data are loaded from a non-volatile memory 306 (e.g., memory channels 204 in FIG. 2), and replace a prior data portion (e.g., a subset DS2 of the first data portion DS1) that has been processed by the application. In some embodiments, the computational subsystem makes requests from the storage subsystem to perform these load operations.

In some embodiments, the computational subsystem receives an instruction from the application or algorithm to process a data set 504 (e.g., a file), and determines a time to load a next data portion DS3 of the data set 504 into the buffer 502 based on the instruction. Conversely, in some embodiments, the computational subsystem detects a time to load the next data portion DS3 of the data set 504 into the buffer 502 independently and automatically without communicating with, or receiving any instruction from, the application or algorithm. For example, in some situations, the memory device 240 detects a page fault and loads the next data portion DS3 in accordance with detection of the page fault. Application of the page fault is compatible with an operating system, which executes the application or algorithm and can provision a limited physical memory capacity via a swap file subsystem. Under some circumstances, the memory device 240 applies a predictive mechanism to initiate loading of the next data portion of the data set processed by the application or algorithm, thereby allowing the next data portion DS3 to be loaded in parallel with processing of a data portion (e.g., a data portion 512 of the subset DSB of the data set 504) that is previously loaded.

Figure 6:
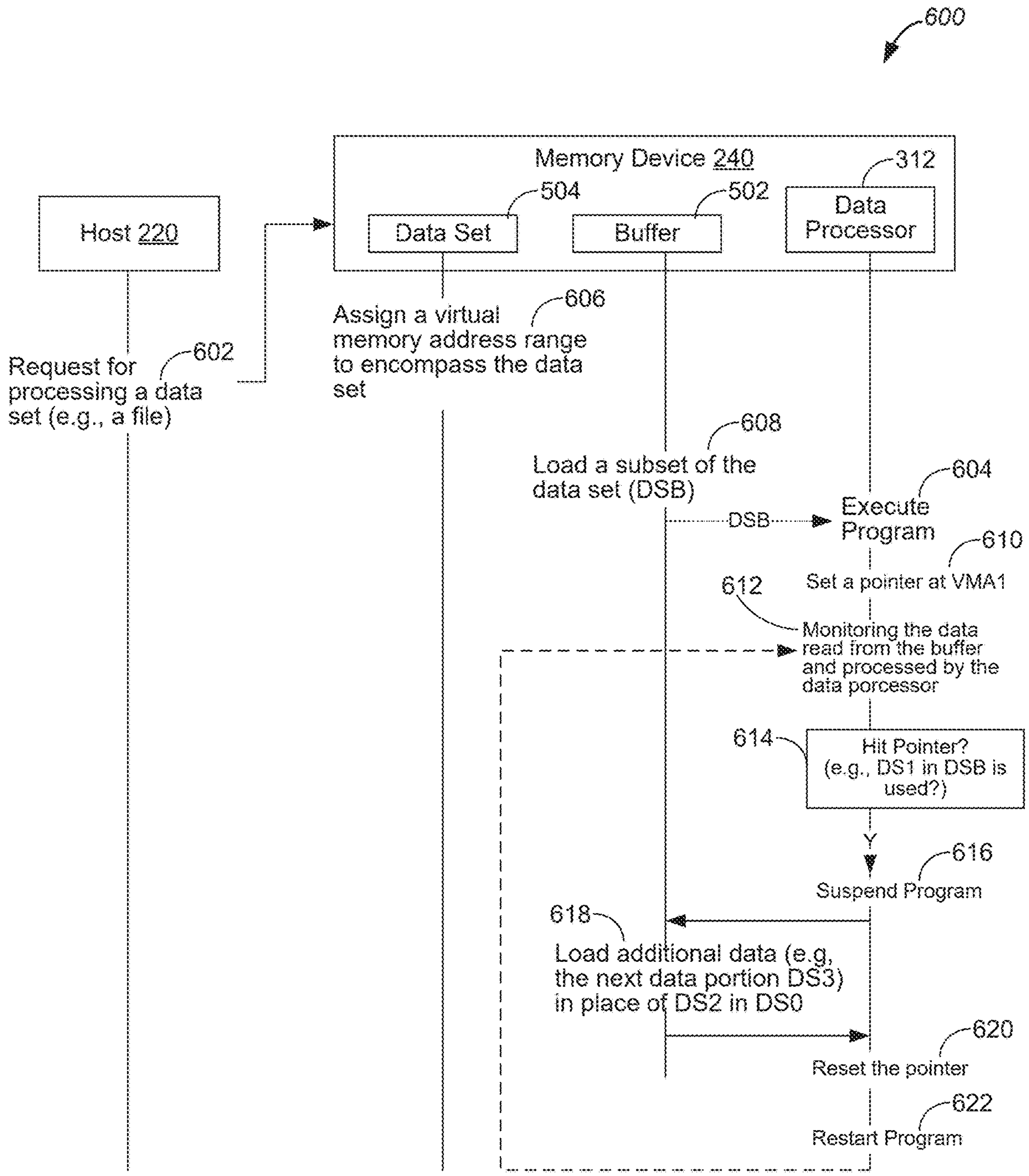
FIG. 6 is a flow diagram of an example in-memory data processing method, in accordance with some embodiments.

FIG. 6 is a flow diagram of an example in-memory data processing method 600, in accordance with some embodiments. The method 600 is implemented by a memory device 240 coupled to a host device 220. The memory device 240 includes a data processor 312, a memory controller 202, a volatile memory 304 (e.g., DRAM 228A, SRAM 224), and a non-volatile memory 306 (e.g., memory channels 204), and also called a computational storage device 240. A portion of the volatile memory 304 is allocated to facilitate data processing by the data processor 312, and includes a buffer 502 having a buffer size $S_B$. A data set 504 is stored in the non-volatile memory 306 and has a data size $S_D$ greater than the buffer size $S_B$. Portions of the data set 504 are temporarily stored in the buffer 502, before the portions of the data set 504 are processed by the data processor 312.

In some embodiments, the host device 220 requests (operation 602) the computational storage device 240 (e.g., the memory device 240 having data processing capabilities) to process the data set 504. For example, the memory device 240 receives a data access request for the data set 504. In response to the data set access request, the memory device 240 concurrently loads the data set 504 to the buffer 502, e.g., in batches, and processes the data set 504. In some embodiments, the data set 504 is processed by the data processor 312 of the computational storage device 240, which executes (operation 604) a program provided by the host device 220 or embedded in the memory device 240.

In some embodiments, the computational storage device 240 assigns (operation 606) a virtual memory address range VMA0-VMA9 to encompass the data set 504, where the addresses VMA0 and VMA9 correspond to a starting virtual memory address VMA0 and a terminal virtual memory address VMA9 of the data set 504. The computational storage device preloads (operation 608) a subset DSB of the data set 504, which can fit in the buffer 502. In some embodiments, the subset DSB of the data set 504 includes a data item corresponding to the starting virtual memory address VMA0. After the subset DSB of the data set 504 is loaded to the buffer 502, the corresponding virtual memory addresses (e.g., VMA1-VMA4) within the virtual memory address range VMA0-VMA9 are mapped to the physical addresses of the buffer 502.

In some embodiments, the computational storage device 240 begins execution (operation 604) of the program and provides (operation 610) a pointer 520. For example, the pointer 520 may point to a starting virtual memory address VMA0 corresponding to a beginning of a virtual memory space of the data set 504, when data having the lowest virtual memory addresses of the data set 504 are initially loaded in the buffer 502. In another example, the pointer 520 may be initially set to a virtual memory address VMA1 in FIG. 5A. As data stored in the buffer 502 are read and processed by the program, the computational storage device 240 monitors (operation 612) the data read from the buffer 502 using the pointer 520 based on the virtual memory address range VMA0-VMA9, and determines whether additional data (e.g., the next data portion DS3 in FIGS. 5B and 5C) need to be loaded from the non-volatile memory 306. In accordance with a determination (operation 614) that data processed by the data processor 312 (e.g., identified by the pointer 520) hit the trigger threshold 506 (TT), additional data are needed to be loaded into the buffer 502. In some embodiments, the computational storage device 240 suspends (operation 616) the program, and selects a subset DS2 of a first data portion DS1. The first data portion DS1 is stored in the buffer 240 and already processed by the data processor 312. The selected subset DS2 of the first data portion DS1 is replaced (operation 618) with the additional data (e.g., the next data portion DS3) extracted from the non-voltage memory 306 (also called storage media).

After the next data portion DS3 is stored in the buffer 502 in place of the subset DS2 of the first data portion DS1, the subset DSB of the data set 504 is updated, so is the trigger threshold 506 reset (operation 620) based on the subset DSB of the data set 504. The data processor 312 continues execution (operation 622) of the program from an unprocessed second data portion 512 (FIGS. 5B and 5C) of the subset DSB of the data set 504 to the additional data newly loaded in the buffer 502, e.g., until the data processor 312 hits the trigger threshold 506 (TT) or another interrupt indicator (e.g., a page fault).

Figure 7A:
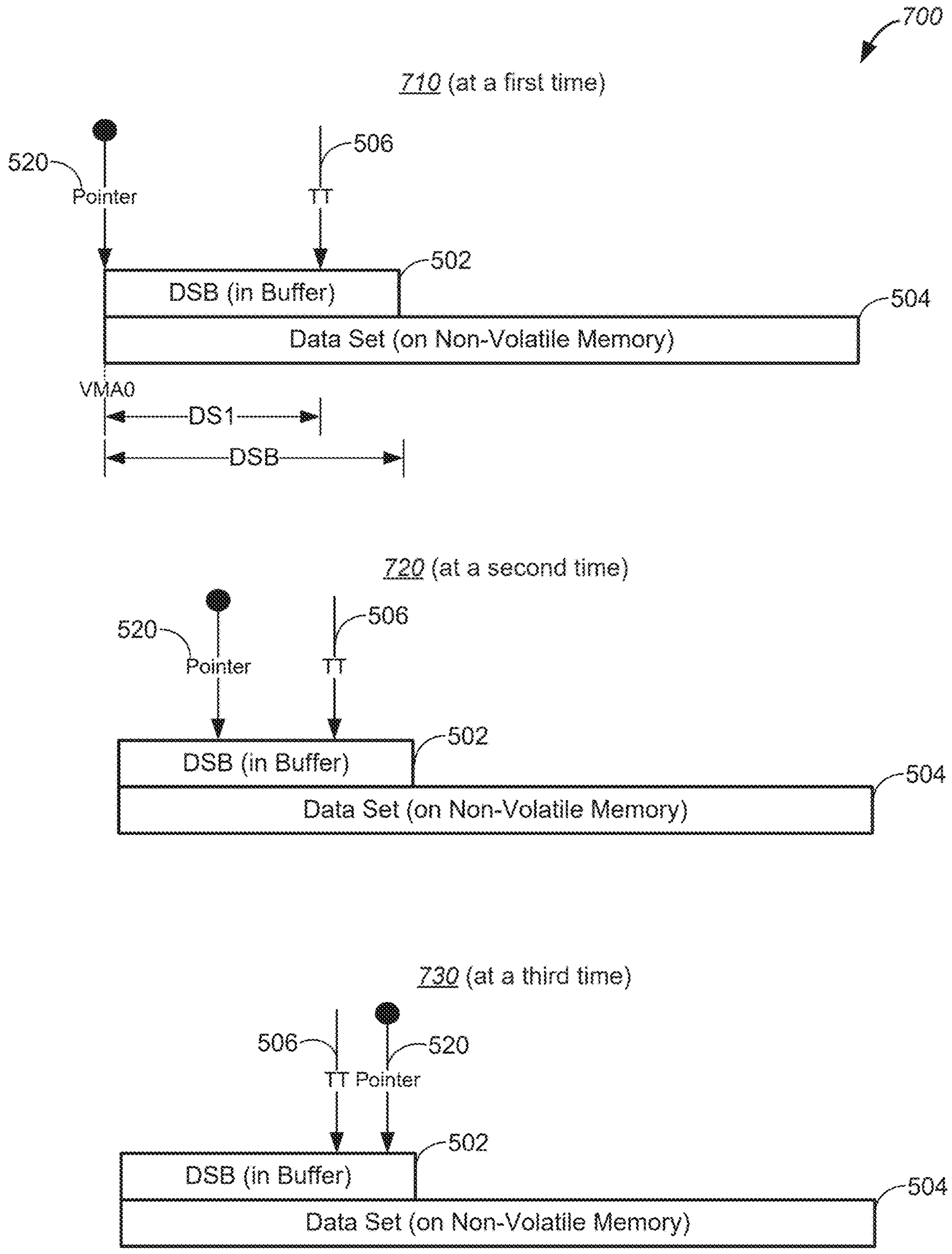
FIGS. 7A and 7B illustrate an example process of buffering a data set in a memory device, in accordance with some embodiments.
Figure 7B:
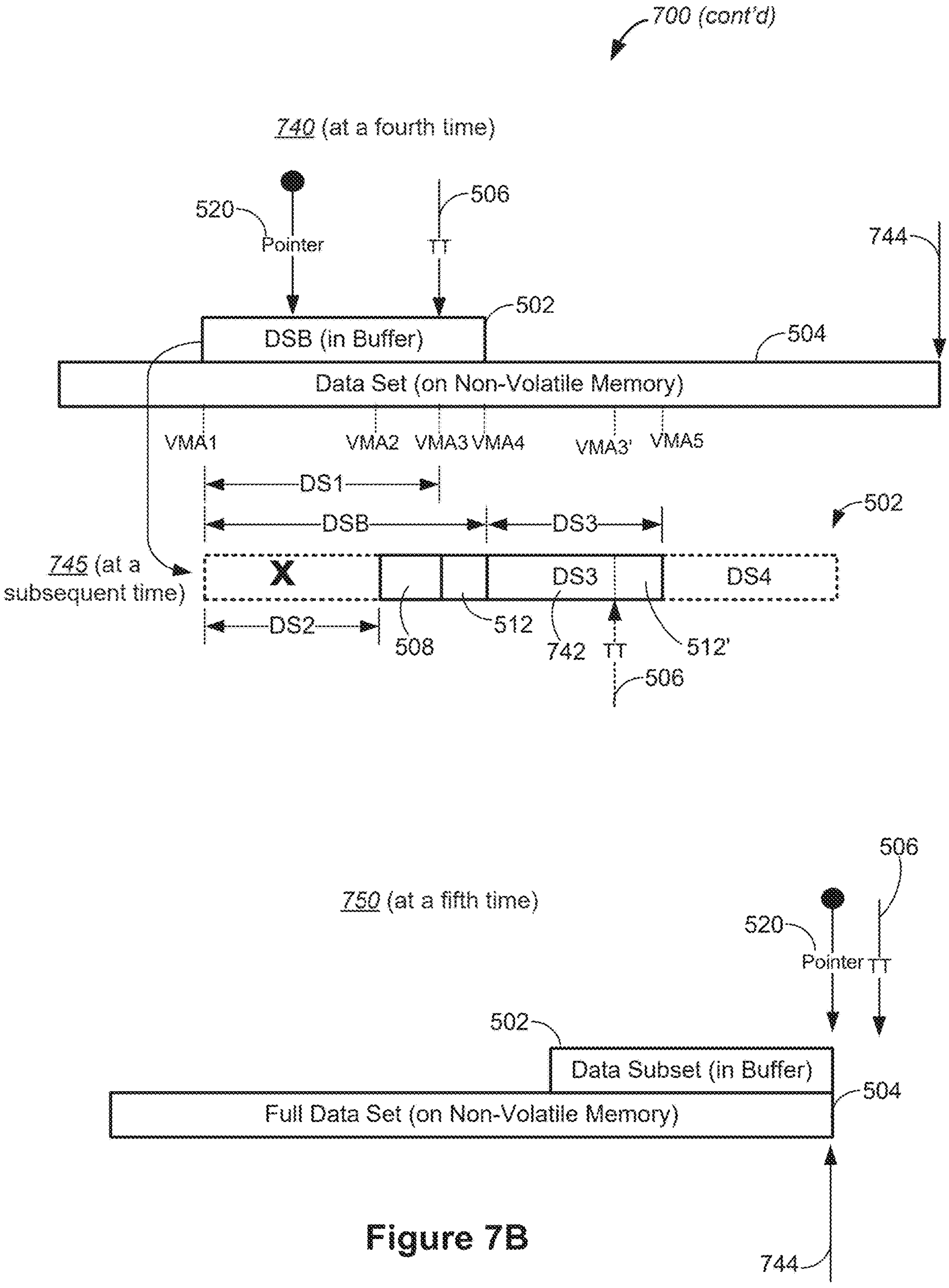

FIGS. 7A and 7B illustrate an example process 700 of buffering a data set 504 in a memory device 240, in accordance with some embodiments. The process 700 includes a temporal sequence of buffer states 710, 720, 730, 740, and 750 in which a subset of an example data set 504 is loaded to a buffer 502 while the data set 504 is processed by a memory device 240. The process 700 is implemented by a memory device 240 having a data processor 312, a memory controller 202, a volatile memory 304 (e.g., DRAM 228A, SRAM 224), and a non-volatile memory 306 (e.g., memory channels 204). The memory device 240 is also called a computational storage device 240. A portion of the volatile memory 304 is allocated to facilitate data processing by the data processor 312, and includes a buffer 502 having a buffer size SB. A data set 504 is stored in the non-volatile memory 306 (e.g., including NAND memory cells) and has a data size $S_D$ greater than the buffer size $S_B$. Subsets of the data set 504 are successively stored in the buffer 502, allowing the data set 504 to be processed by the data processor 312.

Referring to FIG. 7A, in some embodiments, at a first time corresponding to a buffer state 710, a subset DSB of the data set 504 includes data stored in a starting virtual memory address VMA0, and is loaded from the non-volatile memory 306 to the buffer 502 (e.g., filling the buffer 502). The memory device 240 identifies a first data portion DS1 having a predefined portion size. When the first data portion DS1 has been processed and hits a trigger threshold 506 (TT), a subset DS2 of the first data portion DS1 is replaced with a next data portion DS3.

In some embodiments, at a second time corresponding to a buffer state 720, the data processor 312 reads and processes data stored in the buffer 502, and a pointer 520 may be applied to track how much of the subset DSB of the data set 504 has been read from the buffer 502 for further data processing. For example, the pointer 520 is initially set to the starting virtual memory address VMA1 in the buffer state 710. The pointer 520 moves towards the trigger threshold 506 (TT) in the buffer state 720, as the subset DSB of the data set 504 stored in the buffer 502 is read and processed by the data processor 312. Further, in some embodiments, at a third time corresponding to a buffer state 730, the pointer 520 passes the trigger threshold 506 (TT), and heads to an end of the subset DSB of the data set 504 stored in the buffer 502. In some situations, when all of the subset DSB of the data set 504 loaded in the buffer 502 is processed by the data processor 312, the pointer 520 stops at the end of the buffer 502 and corresponds to a last virtual memory address of the subset DSB of the data set 504 (e.g., in the buffer state 750 in FIG. 7B).

Referring to FIG. 7B, in some embodiments, at a fourth time corresponding to a buffer state 740, another subset DSB of the data set 504 includes data stored in an intermediate virtual memory address between addresses VMA1 and VMA4, and is loaded from the non-volatile memory 306 to the buffer 502 (e.g., filling the buffer 502). The first data portion DS1 is updated based on the predefined portion size corresponding to the trigger threshold 506 (TT). For example, the predefined portion size corresponds to a condition data stored in a portion (e.g., 80%, 90%) of the buffer 502 are processed. The trigger threshold 506 (TT) corresponds to a virtual memory address VMA3 of the data set 504. The pointer 520 moves towards the trigger threshold 506 (TT) in the buffer state 740, as the subset DSB of the data set 504 stored in the buffer 502 is read and processed by the data processor 312.

In some embodiments, at a subsequent time corresponding to a buffer state 745, in accordance with a determination that the first data portion DS1 has been processed (e.g., the pointer 520 hits the trigger threshold 506 (TT)), a next data portion DS3 of the data set 504 is loaded from the non-volatile memory 306 to the buffer 502 in place of a subset DS2 of the first data portion DS1. The replaced subset DS2 of the first data portion DS1 has a second portion size smaller than or equal to the first portion size of the first data portion DS1. For example, the first data portion DS1 is 80% of the subset DSB of the data set 504 in size, and the replaced subset DS2 is 50% of the subset DSB of the data set 504 in size. The next data portion DS3 has the same second portion size as the replaced subset DS2 of the first data portion DS1, and for example, is 50% of the subset DSB of the data set 504 in size. In some embodiments, the first data portion DS1 has a set of first virtual memory addresses VMA1-VMA3, and the replaced subset DS2 of the first data portion DS1 has a subset of virtual memory addresses VMA1-VMA2 of the set of first virtual memory addresses VMA1-VMA3. In some embodiments, the replaced subset DS2 of the first data portion DS1 has a set of virtual memory addresses lower than a remainder of the set of first virtual memory addresses of the first data portion DS1 (e.g., lower than virtual memory addresses of the remainder subset 508 of the first data portion DS1).

In some embodiments, the subset DSB of the data set 504 corresponds to an ordered sequence of successive virtual memory addresses VMA1-VMA4 of the data set 504, and the first data portion DS1 has a set of first virtual memory addresses VMA1-VMA3 lower than a remainder (e.g., VMA3-VMA4) of the ordered sequence of successive virtual memory addresses VMA1-VMA4. The next data portion DS3 has a set of successive virtual memory addresses immediately following the ordered sequence of successive virtual memory addresses VMA1-VM4.

In some embodiments, the subset DSB of the data set 504 includes data blocks having an ordered sequence of successive virtual memory addresses VMA1-VMA4, the data processor 312 processes the data blocks of the subset DSB of the data set 504 successively based on the ordered sequence of successive virtual memory addresses VMA1-VMA4, after the subset DSB of the data set 504 are read from buffer 502. For example, the virtual memory address VMA 1 is lower than the virtual memory address VMA4, and data processing goes from the virtual memory address VMA1 to the virtual memory address VMA4 sequentially.

In some embodiments, the first data portion DS1 is complementary to a second data portion 512 in the subset DSB of the data set 504 loaded to the buffer 502. The memory device 240 sets a set of second virtual memory addresses of the second data portion 512 as invalid based on the predefined portion size (e.g., corresponding to the trigger threshold 506). In the buffer state 740, in accordance with a determination that the set of second virtual memory addresses of the second data portion 512 is called by the one or more processors of the memory device 240 (e.g., by a data processor 312), the memory device 240 generates a page fault indicator and determines that the first data portion DS1 has been processed based on the page fault indicator, thereby entering the buffer state 745 and allowing the next data portion DS3 to replace the subset DS2 of the first data portion DS1.

Further, in some embodiments, after determining that the first data portion DS1 has been processed, the memory device 240 changes the set of second virtual memory address of the second data portion 512 as valid, and continues to process the second data portion 512 that is loaded in the buffer 502, concurrently while the next data portion DS3 is being loaded to the buffer 240 in place of the subset DS2 of the first data portion DS1. Alternatively, in some embodiments, after the next data portion DS3 is completely loaded to the buffer 240 in place of the subset DS2 of the first data portion DS1, the memory device 240 changes the set of second virtual memory address of the second data portion 512 as valid, and continues to process the second data portion 512.

In some embodiments, in the buffer state 745, the trigger threshold 506 is updated with loading of the next data portion DS3. The memory device 240 sets a set of virtual memory addresses VMA3'-VMA5 of a second data portion 512', which is part of the next data portion DS3 of the data set 504, as invalid based on the predefined portion size. In accordance with a determination that the set of virtual memory addresses VMA3'-VMA5 of the second data portion 512' is called by the one or more processors (e.g., the data processor 312), the memory device 240 generates a page fault indicator configured to initiate loading a subsequent data portion DS4 of the data set 504 from the non-volatile memory 306 to the buffer 502 in place of at least a subset of the next data portion DS3 that is loaded to the buffer 502. Further, in some embodiments, the set of second virtual memory addresses VMA3'-VMA5 of the second data portion 512' are higher than virtual memory addresses VMA4-VMA3' of a remainder data portion 742 of the next data portion DS3, where the second data portion 512' is complementary to the remainder data portion 742 in the next data portion DS3.

Additionally, in some embodiments, after determining that the remainder data portion 742 has been processed, the memory device 240 changes the set of second virtual memory address of the second data portion 512' as valid, and continues to process the second data portion 512' that is loaded in the buffer 502, concurrently while the subsequent data portion DS4 is being loaded to the buffer 502. In some embodiments, the set of second virtual memory addresses of the second data portion 512' are set as invalid, in accordance with a determination that the next data portion DS3 of the data set 504 does not correspond to a data end indicator 744 identifying an end of the data set 504. Stated another way, starting from the virtual memory address VMA0, successive portions of the data set 504 may be loaded into the buffer 502 sequentially (e.g., for a number of times) until a data end indicator 744 of the data set 504.

In some embodiments, the size of the buffer 502 is determined dynamically based on performance metrics. For example, in accordance with a determination that a memory access load of the memory device 240 is light, the buffer 502 is created with a larger size for a computation application, and the data set 504 needs to be loaded successively with a smaller number of data portions. Conversely, in accordance with a determination that a memory access load of the memory device 240 is large, the buffer 502 is created with a smaller size for a computation application, and the data set 504 needs to be loaded successively with a larger number of data portions.

In some embodiments, at a fifth time corresponding to a buffer state 750, the next data portion DS3 of the data set 504 includes the data end indicator 744 of the data set 504, and the size of the next data portion DS3 is smaller than the subset DS2 of the first data portion DS1. The next data portion DS3 is loaded to partially replace the subset DS2 of the first data portion DS1. The trigger threshold 506 is automatically disabled or associated with an invalid virtual memory address. The memory device 240 continues to process the data loaded in the buffer 502 until hitting the data end indicator 744.

In some embodiments, after the buffer 502 is initially filled, a plurality of intermediate portions (e.g., a next data portion DS3 in FIG. 7B) having a fixed size (e.g., that of the next data portion DS3) are successively loaded into the buffer 502. Each of the plurality of intermediate portions replaces a respective portion (e.g., a subset DS2 of a first data portion DS1 in FIG. 7B) of a corresponding subset DSB of the data set 504 stored in the buffer 502. The plurality of intermediate portions are continual portions of the data set 504. Stated another way, in some embodiments, the data set 504 is divided into a head portion of the data set 504 located at a head of the data set 504, the plurality of intermediate portions having the fixed size, and a tail portion located at a tail of the data set 504. The head portion of the data set 504 fills the buffer 502, and has a size greater than the fixed size. The tail portion of the data set 504 may be smaller than the fixed size. The head portion, the intermediate portions, and the tail portion are successively loaded into the buffer 502 to facilitate further data processing by the data processor 312. By these means, processing of the data set 504 needs to be interrupted for a limited number of times to initiate loading of the intermediate portions and the tail portion, and is implemented substantially continuously, while no resources need to be reserved to maintain continuous and parallel data loading.

Figure 8:
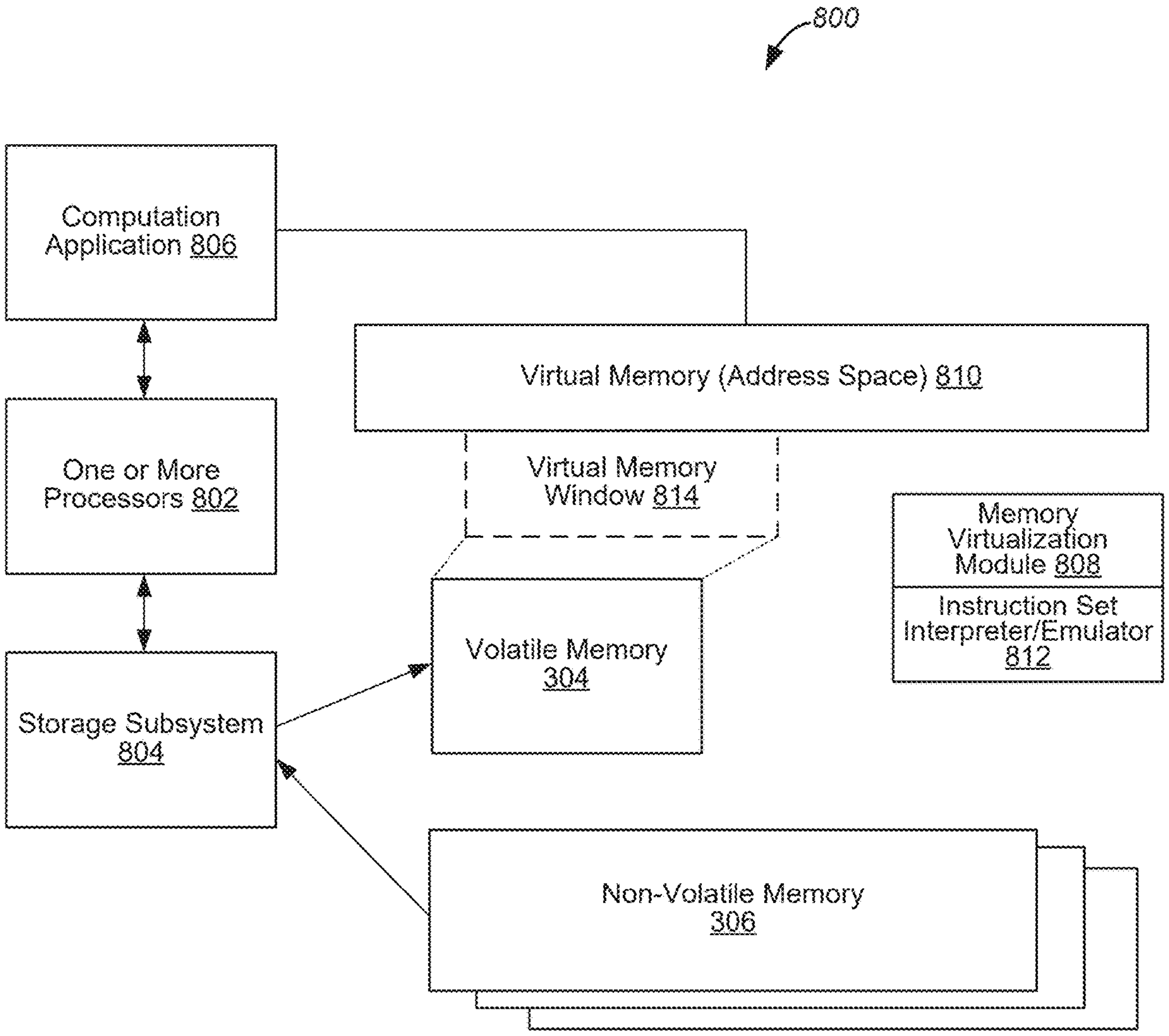
FIG. 8 is a block diagram of an example computational storage support platform for buffering and processing a data set, in accordance with some embodiments.

FIG. 8 is a block diagram of an example computational storage support platform 800 for buffering and processing a data set 504, in accordance with some embodiments. The computational storage support platform 800 is established based on a memory device 240, which includes one or more processors 802 and a storage subsystem 804. The storage subsystem 804 further includes a non-volatile memory 306 and a volatile memory 304. In some embodiments, the one or more processors 802 provides a data processor 312 configured to execute a computation application 806 including algorithm or program(s) to process user data stored on the non-volatile memory 306. The computational storage support platform 800 combines software and/or hardware features to provide an execution environment for the computation application 806, creates an interface to the storage subsystem 804, and/or includes software components ranging from firmware programs to an operating system having custom libraries and drivers. In some embodiments, the computational storage support platform 800 implements memory virtualization, address monitoring, and storage accessing.

In some embodiments, the computational storage support platform 808 includes a memory virtualization module. The memory virtualization module is configured to virtualize memory space and monitor memory accesses. An internal application programming interface (API) is applied to abstract a data set 504 loaded from the non-volatile memory 306. The data set 504 corresponds to a range of virtual memory addresses in a virtual memory space 810. The API translates physical memory addresses using large block addressing (LBA) and application-provided file or object mapping.

In some embodiments, an instruction set interpreter/emulator 812 includes a memory address virtualization system with an embedded check for memory subset hit/miss condition. The interpreter/emulator 812 directly remaps virtual memory addresses within a virtual memory range to physical memory addresses. In some situations, the interpreter/emulator 812 requests read operations on the storage subsystem 804, thereby appropriately changing virtual to physical memory mapping.

In some embodiments, the computational storage support platform 800 includes a hardware assisted snooping feature. A processor of the memory device 240 monitors addresses associated with load operations, detects accesses passing the trigger threshold 506, and asserts interrupt to data processing. An interrupt service routine is established to issue load requests and moves a virtual memory window 814, which corresponds to the subset DSB of the data set 504 in FIGS. 5A-5C and 7A-7B.

In some embodiments, the computational storage support platform 800 supports page faults on a firmware level. For example, firmware provides the computational storage support platform 800 in the form of functionality by loading, allocating, and managing the virtual memory space 810 and buffer 502 to be used by a computation application 806 prior to execution of the computation application 806. The allocated virtual memory space 810 encompasses the data set 504 (e.g., an entire input file or object) to be processed. Conversely, the buffer 502 has a smaller size than the data set 504, and only a subset DSB of the virtual memory space 810 is backed by physical memory (e.g., volatile memory 304) allocated to the buffer 502. In some embodiments, the one or more processors 802 of the memory device 240 (also called memory management unit (MMU)) executes program codes, e.g., via a page table, to generate a fault when the computation application 806 attempts to access (e.g., load, store) a memory page that is not yet loaded. Further, in some embodiments, in response to detection of a page fault, the data processor 312 generates an interrupt, and is hooked directly to a firmware component, which in turn makes request(s) to the storage subsystem 804. In response to the request(s), a subset DS2 of the first data portion DS1 may be replaced in the buffer 502 by a next data portion DS3. The firmware component may update contents of the page table to reflect the physical address(es) of the next data portion in the buffer, 502, and mark virtual memory addresses (e.g., VMA1-VMA2 in FIG. 5C) associated with the replaced pages in the subset DS2 of the first data portion DS1 as invalid).

Further, in some embodiments, the computational storage support platform 800 includes a threshold and look-ahead feature. Firmware programs an MMU page table, such that memory pages above the trigger threshold 506, but within the subset DSB of the data set 504, trigger a page fault.

Stated another way, the memory pages of the buffer 502 corresponding to the second data portion 512 (FIGS. 5B and 7B) are associated with a page fault indicator. Upon detection of the page fault indicator associated with the second data portion 512, the firmware makes requests to load the next data portion DS3 of the data set 504, and programs the page table to map the virtual memory addresses of the next data portion DS3 to a corresponding portion of the buffer 502 prior to returning to the computation application 806. Application of the page fault indicators allows the computational storage support platform 800 to operate efficiently, particularly because the storage subsystem 804 executes the computation application 806 in parallel with loading the next data portion.

Alternatively, in some embodiments, a page fault indicator is generated on a level of an operating system or the computation application 806 loaded in the operating system, when the computation application 806 attempts to access (e.g., load, store) a memory page that is not yet loaded. The computational storage support platform 800 include the operating system (e.g., Linux) with custom drivers and applies hardware virtualization on a firmware. The operating system is implemented on a data processor 312 of the memory device 200. In some embodiments, one or more handling routines are added to an existing page fault (swap) scheme to redirect swap requests to the virtual memory space 810 associated with the data set 504 and directly load the subset DSB of the data set 504 in the storage subsystem 804. Additionally, in some embodiments, in response to the one or more handling routines, handlers are configured to skip storing the existing page that is being swapped, given that the input file already exists on the storage media.

Further, in some embodiments, the computational storage support platform 800 includes a threshold and look-ahead feature. The page fault (swap) scheme embeds partial mapping of virtual pages into an OS virtual memory scheme to implement detection of the pointer 520 hitting or passing the trigger threshold 506.

In some embodiments, the memory device 240 loads an operating system (e.g., Linux) in a subset of the one or more processors 802. The memory device 240 executes, in the operating system, a computation application 806 includes a program for processing the data set 504. The data set 504 corresponds to an ordered sequence of successive virtual memory address (e.g., VMA0-VMA9 in FIG. 5A). The computation application 806 continues execution to set a set of first virtual memory addresses (e.g., VMA1-VMA3 in FIG. 5B) corresponding to the first data portion DS1 as valid and set a set of second virtual memory addresses corresponding to a second data portion 512 complementary to the first data portion DS1 in the subset DSB of the data set 504 as invalid. A firmware application is executed. In accordance with a determination that the firmware application hit invalid data, the firmware application determines that the first data portion DS1 has been processed and loads the next data portion DS3 of the data set to the buffer in place of the subset DS2 of the first data portion DS1.

Alternatively, in some embodiments, the memory device 240 executes a firmware application for processing the data set 504. The firmware application sets a set of first virtual memory addresses (e.g., VMA1-VMA3 in FIG. 5B) corresponding to the first data portion DS1 as valid, and sets a set of second virtual memory addresses corresponding to a second data portion 512 complementary to the first data portion DS1 in the subset DSB of the data set 504 as invalid. In accordance with a determination that the firmware application hit invalid data, the firmware application determines that the first data portion DS1 has been processed.

Figure 9:
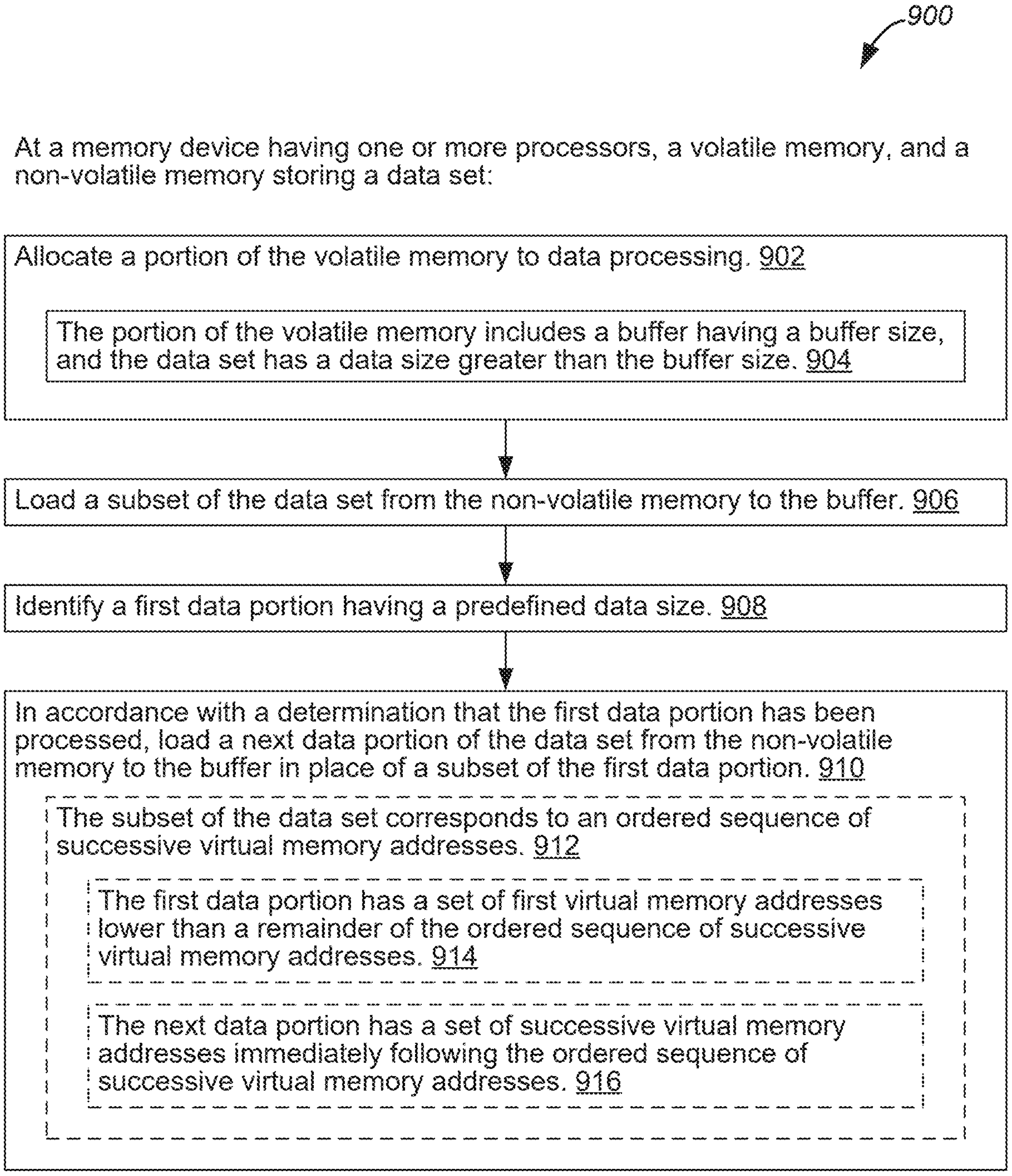
FIG. 9 is a flow diagram of an example method for buffering and processing data in a memory device, in accordance with some embodiments.

FIG. 9 is a flow diagram of an example method 900 for buffering and processing data in a memory device 240, in accordance with some embodiments. The method 900 is implemented at the memory device 240 having one or more processors 802 (e.g., memory controller 202 in FIG. 2, data processor 312 in FIG. 3), a volatile memory 304 (e.g., DRAM 228A, SRAM 224), and a non-volatile memory (e.g., memory channels 204) storing a data set 504.

The memory device 240 allocates (operation 902) a portion of the volatile memory 304 to data processing. The portion of the volatile memory 304 includes (operation 904) a buffer 502 having a buffer size, and the data set 504 has a data size greater than the buffer size. The memory device 240 loads (operation 906) a subset DSB of the data set 504 (e.g., data sets 504 in FIGS. 5A and 7A) from the non-volatile memory 306 to the buffer 502. The memory device 240 identifies (operation 908) a first data portion DS1 having a predefined portion size (e.g., corresponding to a trigger threshold 506 in FIGS. 5A-5C and 7A-7B). In accordance with a determination that the first data portion DS1 has been processed, the memory device 240 loads (operation 910) a next data portion DS3 of the data set 504 from the non-volatile memory 306 to the buffer 502 in place of a subset DS2 of the first data portion DS1. The subset DS2 of the first data portion DS1 has a second specific size that is equal to or smaller than the first specific size of the first data portion DS1. For example, the first specific size is set as 90% of the buffer size, and the second specific size is set as 60% of the buffer size.

In some embodiments, the subset DSB of the data set 504 corresponds (operation 912) to an ordered sequence of successive virtual memory addresses (e.g., VMA1-VMA4), and the first data portion DS1 has (operation 914) a set of first virtual memory addresses (e.g., VMA1-VMA3) lower than a remainder (e.g., VMA3-VMA4) of the ordered sequence of successive virtual memory addresses. The next data portion DS3 has (operation 916) a set of successive virtual memory addresses (e.g., VMA4-VMA5) immediately following the ordered sequence of successive virtual memory addresses (e.g., VMA1-VMA4).

In some embodiments, the subset DSB of the data set 504 includes data blocks having an ordered sequence of successive virtual memory addresses (e.g., VMA1-VMA4 in FIGS. 5A and 7B). The memory device 240 processes the data blocks of the subset DSB of the data set 504 successively based on the ordered sequence of successive virtual memory addresses. For example, the data blocks are loaded to the buffer 502 and processed by a data processor from low virtual memory addresses to high virtual memory addresses (e.g., from VMA1 to VMA4) sequentially.

In some embodiments, the subset DS2 of the first data portion DS1 is equal to the first data portion DS1. Alternatively, in some embodiments, the subset DS2 of the first data portion DS1 is less than all of the first data portion DS1. Further, in some embodiments, the first data portion DS1 has a set of first successive virtual memory addresses (e.g., VMA1-VMA3 in FIG. 7B), and the subset DS2 of the first data portion DS1 has a set of virtual memory addresses (e.g., VMA1-VMA2 in FIG. 7B) lower than a remainder (e.g., VMA2-VMA3 in FIG. 7B) of the ordered set of virtual memory addresses. In some embodiments, the first data portion DS1 has an ordered set of successive virtual memory addresses, and the subset DS2 of the first data portion DS1 has a subset of successive virtual memory addresses of the ordered set of successive virtual memory addresses.

In some embodiments, the first data portion DS1 is complementary to a second data portion 512 in the subset DSB of the data set 504 loaded to the buffer 502. The memory device 240 sets a set of second virtual memory addresses (e.g., VMA3-VMA4 in FIG. 7B) of the second data portion 512 as invalid based on the predefined portion size. In accordance with a determination that the set of second virtual memory addresses of the second data portion 512 is called by one or more processors, the memory device 240 generates a page fault indicator and determines that the first data portion DS1 has been processed based on the page fault indicator. Further, in some embodiments, after determining that the first data portion DS1 has been processed, the memory device 240 changes the set of virtual memory address of the second data portion 512 as valid, and continues to process the second data portion 512 that is loaded in the buffer 502, while the next data portion DS3 is being loaded to the buffer 502;

In some embodiments (FIG. 7B), the memory device 240 sets a set of second virtual memory addresses of a second data portion 512', in the next data portion DS3 of the data set 504, as invalid based on the predefined portion size. In accordance with a determination that the set of second virtual memory addresses (e.g., VMA3'-VMA5) of the second data portion 512' is called by the one or more processors 802, the memory device 240 generates a page fault indicator configured to initiate loading a subsequent data portion DS4 of the data set 504 from the non-volatile memory 306 to the buffer 502 in place of at least a subset of the next data portion DS3 that is loaded to the buffer 502. Further, in some embodiments, the set of second virtual memory addresses of the second data portion 512' are higher than virtual memory addresses of a remainder data portion 742 of the next data portion DS3. Additionally, in some embodiments, after determining that the remainder data portion 742 has been processed, the memory device 240 changes the set of virtual memory address of the second data portion 512' as valid and continues to process the second data portion 512 that is loaded in the buffer 502, while the subsequent data portion DS4 is being loaded to the buffer 502. In some embodiments, the set of second virtual memory addresses of the second data portion 512' are set as invalid, in accordance with a determination that the next data portion DS3 of the data set 504 does not correspond to a data end indicator of the data set 504.

In some embodiments, the memory device 240 loads an operating system in a subset of the one or more processors 802 of the memory device 240 and executes, in the operating system, a computation application 806 including a program for processing the data set 504. The data set 504 corresponds to an ordered sequence of successive virtual memory address (e.g., VMA0-VMA9 in FIG. 5A). The memory device 240 sets a set of first virtual memory addresses (e.g., VMA1-VMA3) corresponding to the first data portion DS1 as valid and a set of second virtual memory addresses (e.g., VMA3-VMA4) corresponding to a second data portion 512 complementary to the first data portion DS1 in the subset DSB of the data set 504 as invalid. A firmware application is executed. In accordance with a determination that the firmware application hit invalid data, the firmware application determines that the first data portion DS1 has been processed and loads the next data portion DS3 of the data set to the buffer in place of the subset DS2 of the first data portion DS1.

In some embodiments, the memory device 240 executes a firmware application for setting a set of first virtual memory addresses corresponding to the first data portion DS1 as valid; setting a set of second virtual memory addresses corresponding to a second data portion 512 complementary to the first data portion DS1 in the subset DSB of the data set 504 as invalid; and in accordance with a determination that the firmware application hit invalid data, determining that the first data portion DS1 has been processed.

In some embodiments, one or more processors 802 are configured to provide a memory controller 202 and a data processor 312, which processes the subset DSB of the data set 504 loaded into the buffer 502.

In some embodiments, the first data portion DS1 is complementary to a second data portion 512 in the subset DSB of the data set 504 loaded to the buffer 502. The memory device 240 processes the second data portion 512, concurrently while loading the next data portion DS3 of the data set 504 to the buffer 502 in place of the subset DS2 of the first data portion DS1.

In some embodiments, the memory device 240 receives a data access request for the data set 504, and in response to the data set access request, concurrently loads the data set 504 to the buffer 502 and processes the data set 504.

It is noted that, in some implementations of this application, any virtual memory addresses, which is represented as a first address to a second address (e.g., VMA1-VMA2), include the first address and do not include the second address. In other words, in an example, VMA3 does not belong to virtual memory addresses VMA1-VMA3, and belongs to virtual memory addresses VMA3-VMA4.

Memory is also used to store instructions and data associated with the method 900, and includes high-speed random access memory, such as DRAM, SRAM, DDR RAM, or other random access solid state storage devices; and, optionally, includes non-volatile memory, such as one or more magnetic disk storage devices, one or more optical disk storage devices, one or more flash storage devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 900.

Each of the above identified elements may be stored in one or more of the previously mentioned storage devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for data buffering, comprising:

at a memory device having one or more processors, a volatile memory, and a non-volatile memory storing a data set:

allocating a portion of the volatile memory to facilitating data processing, the portion of the volatile memory including a buffer having a buffer size, the data set having a data size greater than the buffer size;

loading a subset of the data set from the non-volatile memory to the buffer;

identifying, in the subset of the data set, a first data portion having a predefined portion size; and in accordance with a determination that the first data portion has been processed, loading a next data portion of the data set from the non-volatile memory to the buffer in place of part of the first data portion, the next data portion being distinct from the subset of the data set.

2. The method of claim 1, wherein the subset of the data set corresponds to an ordered sequence of successive virtual memory addresses, and the first data portion has a set of first virtual memory addresses lower than a remainder of the ordered sequence of successive virtual memory addresses, and wherein the next data portion has a set of successive virtual memory addresses immediately following the ordered sequence of successive virtual memory addresses.

3. The method of claim 1, wherein the subset of the data set includes data blocks having an ordered sequence of successive virtual memory addresses, the method further comprising:

processing the data blocks of the subset of the data set successively based on the ordered sequence of successive virtual memory addresses.

4. The method of claim 1, wherein the part of the first data portion is equal to the first data portion.

5. The method of claim 1, wherein the part of the first data portion is less than all of the first data portion.

6. The method of claim 5, wherein the first data portion has a set of first virtual memory addresses, and the part of the first data portion has a subset of virtual memory addresses lower than a remainder of the set of first virtual memory addresses.

7. The method of claim 5, wherein the first data portion has a set of successive virtual memory addresses, and the part of the first data portion has a subset of successive virtual memory addresses of the set of successive virtual memory addresses.

8. The method of claim 1, wherein the first data portion is complementary to a second data portion in the subset of the data set loaded to the buffer, and the method further comprises:

setting a set of second virtual memory addresses of the second data portion as invalid based on the predefined portion size; and in accordance with a determination that the set of second virtual memory addresses of the second data portion is called by the one or more processors, generating a page fault indicator and determining that the first data portion has been processed based on the page fault indicator.

9. The method of claim 8, the method further comprising, after determining that the first data portion has been processed:

changing the set of second virtual memory addresses of the second data portion as valid; and continuing to process the second data portion that is loaded in the buffer, while the next data portion is being loaded to the buffer.

10. The method of claim 1, further comprising:

setting a set of second virtual memory addresses of a second data portion, in the next data portion of the data set, as invalid based on the predefined portion size; and in accordance with a determination that the set of second virtual memory addresses of the second data portion is called by the one or more processors, generating a page fault indicator configured to initiate loading a subsequent data portion of the data set from the non-volatile memory to the buffer in place of at least a subset of the next data portion that is loaded to the buffer.

11. The method of claim 10, wherein the set of second virtual memory addresses of the second data portion are higher than virtual memory addresses of a remainder data portion of the next data portion.

12. The method of claim 11, the method further comprising, after determining that the remainder data portion has been processed:

changing the set of second virtual memory addresses of the second data portion as valid; and continuing to process the second data portion that is loaded in the buffer, while the subsequent data portion is being loaded to the buffer.

13. The method of claim 10, wherein the set of second virtual memory addresses of the second data portion are set as invalid, in accordance with a determination that the next data portion of the data set does not correspond to a data end indicator.

14. The method of claim 1, further comprising:
loading an operating system in a subset of the one or more processors of the memory device;
executing, in the operating system, a computation application including a program for processing the data set, the data set corresponding to an ordered sequence of successive virtual memory address, including:
setting a set of first virtual memory addresses corresponding to the first data portion as valid; and
setting a set of second virtual memory addresses corresponding to a second data portion complementary to the first data portion in the subset of the data set as invalid; and
executing a firmware application to, in accordance with a determination that the firmware application hit invalid data, determine that the first data portion has been processed and load the next data portion of the data set to the buffer in place of the part of the first data portion.

15. The method of claim 1, further comprising executing a firmware application for:
setting a set of first virtual memory addresses corresponding to the first data portion as valid;
setting a set of second virtual memory addresses corresponding to a second data portion complementary to the first data portion in the subset of the data set as invalid; and
in accordance with a determination that the firmware application hit invalid data, determining that the first data portion has been processed.

16. The method of claim 1, wherein one or more processors are configured to provide a memory controller and a data processor, the method further comprising:
processing, by the data processor, the subset of the data set loaded into the buffer.

17. The method of claim 1, wherein the first data portion is complementary to a second data portion in the subset of the data set loaded to the buffer, the method further comprising:
processing the second data portion, concurrently while loading the next data portion of the data set to the buffer in place of the part of the first data portion.

18. The method of claim 1, further comprising:
receiving a data access request for the data set;
in response to the data set access request, concurrently loading the data set to the buffer and processing the data set.

19. A memory device, comprising:
one or more processors;
a volatile memory; and
a non-volatile memory storing a data set;
wherein the memory device is configured to:
allocate a portion of the volatile memory to facilitating data processing, the portion of the volatile memory including a buffer having a buffer size, the data set having a data size greater than the buffer size;
load a subset of the data set from the non-volatile memory to the buffer;
identify, in the subset of the data set, a first data portion having a predefined portion size; and
in accordance with a determination that the first data portion has been processed, load a next data portion of the data set from the non-volatile memory to the buffer in place of part of the first data portion, the next data portion being distinct from the subset of the data set.

20. A non-transitory computer-readable storage medium, having instructions stored thereon, which when executed by a memory device cause the memory device to perform:
at the memory device having one or more processors, a volatile memory, and a non-volatile memory storing a data set:
allocating a portion of the volatile memory to facilitating data processing, the portion of the volatile memory including a buffer having a buffer size, the data set having a data size greater than the buffer size;
loading a subset of the data set from the non-volatile memory to the buffer;
identifying, in the subset of the data set, a first data portion having a predefined portion size; and
in accordance with a determination that the first data portion has been processed, loading a next data portion of the data set from the non-volatile memory to the buffer in place of part of the first data portion, the next data portion being distinct from the subset of the data set.

* * * * *